(12) United States Patent
Pscherer et al.

(10) Patent No.: US 9,784,392 B2
(45) Date of Patent: Oct. 10, 2017

(54) DEVICE FOR TRANSFERRING FLUIDS

(71) Applicant: Schaeffler Technologies AG & Co. KG, Herzogenaurach (DE)

(72) Inventors: Heidi Pscherer, Aurachtal (DE); Jochen Schaufler, Bubenreuth (DE); Georg Draser, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/917,376

(22) PCT Filed: Sep. 11, 2014

(86) PCT No.: PCT/DE2014/200470
§ 371 (c)(1),
(2) Date: Mar. 8, 2016

(87) PCT Pub. No.: WO2015/043594
PCT Pub. Date: Apr. 2, 2015

(65) Prior Publication Data
US 2016/0215908 A1 Jul. 28, 2016

(30) Foreign Application Priority Data
Sep. 25, 2013 (DE) .......................... 10 2013 219 281

(51) Int. Cl.
*F16L 27/00* (2006.01)
*F16L 27/087* (2006.01)
*F16H 57/04* (2010.01)

(52) U.S. Cl.
CPC .......... *F16L 27/087* (2013.01); *F16H 57/043* (2013.01); *F16H 57/0424* (2013.01); *F16H 57/0426* (2013.01); *F16H 57/0434* (2013.01)

(58) Field of Classification Search
USPC ....................... 285/121.3, 273; 474/7; 185/18
See application file for complete search history.

(56) References Cited

U.S. PATENT DOCUMENTS 2,557,498 A * 6/1951 Collender ............... F16L 39/06
137/625.23
3,411,526 A * 11/1968 Schaefer ................. F16L 39/04
137/312

(Continued)

FOREIGN PATENT DOCUMENTS

CN 2713274 7/2005
CN 2886280 4/2007

(Continued)

OTHER PUBLICATIONS

Machine translation of DE102007048124, 8 pages.*

*Primary Examiner* — Aaron Dunwoody
(74) *Attorney, Agent, or Firm* — Simpson & Simpson, PLLC

(57) ABSTRACT

A device for transferring fluids between two elements arranged concentrically within one another, wherein there is a sleeve-shaped hollow-cylindrical first component arranged between the two elements having at least one through-hole for the fluid, wherein the first component is made of steel and sits in a first element, wherein the first component is prevented from turning around a symmetry axis of the first component by at least one safety element engaging form-fittingly in the first element, wherein the first element is at least partially made of a material having a greater coefficient of thermal expansion than the steel material, characterized by the fact that between the first component and the first element, a second hollow-cylindrical component is arranged concentric to the first component and that the second component is secured from turning around the symmetry axis by a safety element on the first element and the first component.

5 Claims, 3 Drawing Sheets

(56) References Cited

U.S. PATENT DOCUMENTS

| | | | | |
|---|---|---|---|---|
| 4,026,119 A * | 5/1977 | Dotti | .................... | B63B 22/021 |
| | | | | 141/388 |
| 5,439,029 A * | 8/1995 | Becker | .................. | B41F 13/00 |
| | | | | 137/580 |
| 5,529,347 A * | 6/1996 | Lee | ........................ | B66C 23/84 |
| | | | | 285/121.3 |
| 6,354,633 B1 * | 3/2002 | Carrasco | ................ | F16L 39/06 |
| | | | | 285/121.3 |
| 6,412,822 B1 * | 7/2002 | Omiya | ............... | F16L 27/0828 |
| | | | | 277/937 |
| 7,823,929 B2 * | 11/2010 | Hoff | ..................... | F16L 27/087 |
| | | | | 285/121.3 |
| 7,976,069 B2 * | 7/2011 | Imai | ...................... | F16L 39/06 |
| | | | | 285/121.1 |
| 8,074,681 B2 * | 12/2011 | Van Amelsfoort | ... | E02F 3/3681 |
| | | | | 137/580 |
| 8,613,472 B2 * | 12/2013 | Ott | ....................... | F16L 27/087 |
| | | | | 285/121.3 |
| 2002/0017785 A1 * | 2/2002 | Omiya | .................. | F16L 39/04 |
| | | | | 285/121.3 |
| 2004/0113424 A1 * | 6/2004 | Tries | ...................... | F16L 39/04 |
| | | | | 285/121.3 |
| 2005/0046181 A1 * | 3/2005 | Falconer | ............... | F16L 39/06 |
| | | | | 285/121.6 |
| 2016/0146249 A1 * | 5/2016 | Blair | .................... | F16C 17/028 |
| | | | | 464/7 |

FOREIGN PATENT DOCUMENTS

| | | |
|---|---|---|
| CN | 102575800 | 7/2012 |
| DE | 102007048124 | 4/2009 |
| DE | 102009000925 | 8/2010 |
| DE | 102011076796 | 12/2012 |

* cited by examiner

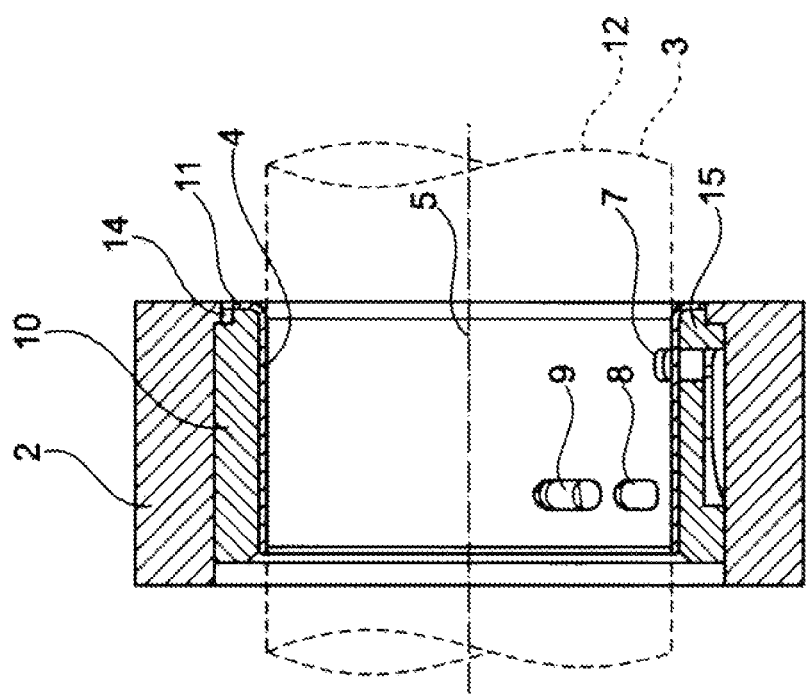
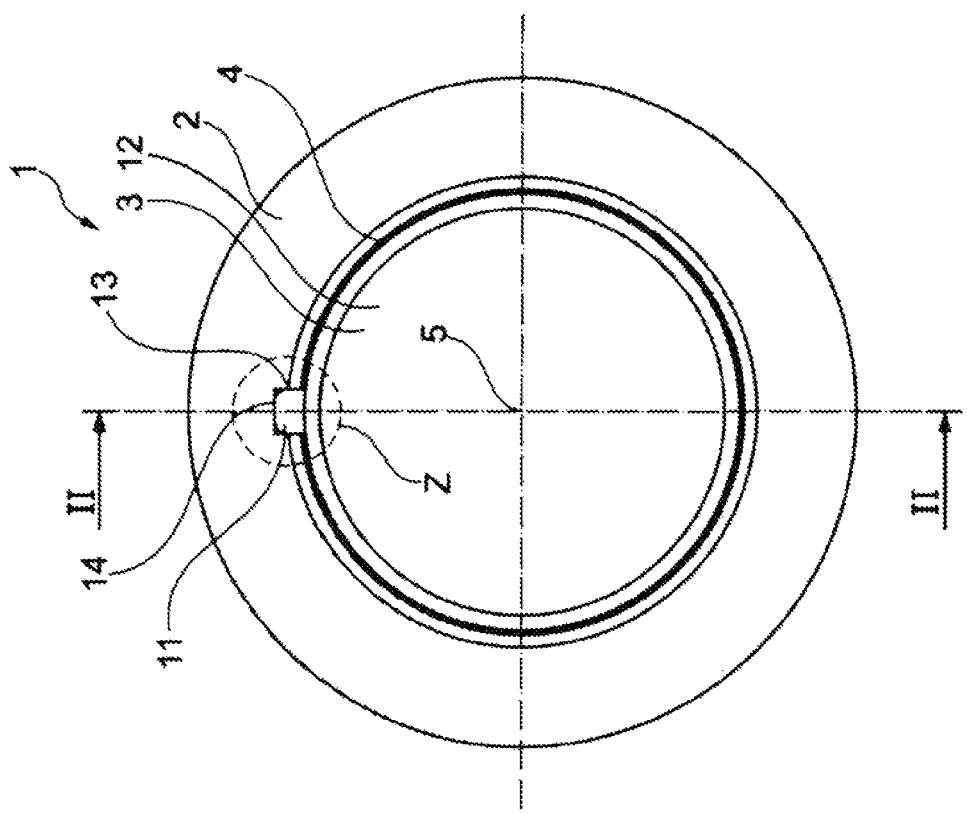

DEVICE FOR TRANSFERRING FLUIDS

CROSS-REFERENCE TO RELATED APPLICATIONS

The present application is the United States National Stage Application pursuant to 35 U.S.C. §371 of International Patent Application No. PCT/DE2014/200470, filed on Sep. 11, 2014, and claims priority to German Patent Application No. DE 10 2013 219 281.9 of Sep. 25, 2013, which applications are incorporated by reference in their entireties.

DESCRIPTION

Field of the Invention

The invention concerns a device for transferring fluids between two concentric elements arranged concentrically within one another, whereby between the two elements is a sleeve-shaped, hollow-cylindrical first component, which has at least one through-hole for the fluids, and whereby the first component is made of steel and sits in the first of the two elements, whereby the first component is secured from turning around a symmetry-axis of the first component by at least one safety element that fits positively in the first component, and whereby the first component is at least partially made of a material that has a higher coefficient of thermal expansion than that of steel.

Background of the Invention

A device for transferring fluid is described in DE 10 2007 048 124 A1. A hole for oil is described in DE 10 2011 076 796 A1. A sealing sleeve arrangement is described in DE 10 2009 000 925A1. These devices are used in gearboxes. The device, through which oil is normally transferred as a lubricating or pressure medium, carries the oil to lubrication points or to pressure cylinders for operating pistons. Often one through-hole, through which oil is transferred from one rotating element to a stationary one or vice-versa, is the essential component of the device. Rotating elements, for example, are gear shafts and stationary elements are the gearbox housings. The device is constituted by a sleeve and a section of housing. The use of such sleeves in housings made of light metal can result in the seating of the housing loosening itself due to the heat created during driving because the housing expands more than the sleeve made of steel due to its higher coefficient of expansion. For this reason, such sleeves in a light metal housing are secured against turning by at least one retaining element. The canals in the device are edged either fully or partly in the material of the housing or housing section, which must therefore be correspondingly complicated and expensive to design and manufacture. The currently known oil conveyers of prior art are made by incorporating the housing and shafts in the design of the required passages. This requires longitudinal and transverse holes, longitudinal, transverse and peripheral grooves to be introduced by complicated machining techniques. Furthermore, the seatings and sealing surfaces for ring gaskets such as these, also described in DE 10 2011 076 796 A1, must be incorporated by machining.

DESCRIPTION OF THE INVENTION

The object of this invention is to make a device that is simple and economical to manufacture.

A second hollow cylindrical component is arranged concentrically to first component, between the first component and the first element. In accordance with this invention, the second component is prevented from turning around the symmetrical axis by the safety element with which the first component is also secured. What is special about this arrangement is that the safety element is formed as one piece from the material from which the first component is made. The first component is preferably a sleeve drawn and stamped out of sheet metal. The safety element is a collar or a lobe pointing radially outwards, a tab or a differently designed protrusion. The protrusion points preferably either in the direction of the symmetry axis or away from the symmetry axis of the sleeve-shaped component, radially through the second component. For this, a wall section of the second component is provided with a hole with a recess (notch) at the edge.

The second component is another sleeve-shaped part made of steel or a component made of a material which has a coefficient of thermal expansion that is greater than the coefficient of thermal expansion of steel. In this case the material of the second component is, for example an aluminum light metal alloy.

One design of the invention provides that the first element is a section of the housing of a vehicle gearbox and the other gearbox element is a shaft leading through the section of the gearbox. Alternatively, the elements are oil holes, canals and pressure chambers in any gearbox assembly. The device in accordance with this invention can be used in all types of gearboxes in which the oil is specifically channeled and the effort of incorporating the channels in the housing and components without the use of this device would be very high. Such devices for guiding and transferring oil have a great significance, since important functions of a gearbox are activated by oil pressure. Examples for this are the controlling of brakes and clutches. The advantage of the invention lies in the fact that three components of the device can be secured to each other with one safety element. With that, the cost of manufacturing the different individual safety elements is reduced.

DESCRIPTION OF THE DRAWINGS

The invention is explained in detail in the following embodiments.

FIG. 1 is a cross-sectional view of a device, in accordance with an embodiment of the present invention;

FIG. 2 is a cross-sectional view of a device, in accordance with an embodiment of the present invention;

DETAILED DESCRIPTION OF THE INVENTION

Figure 3:
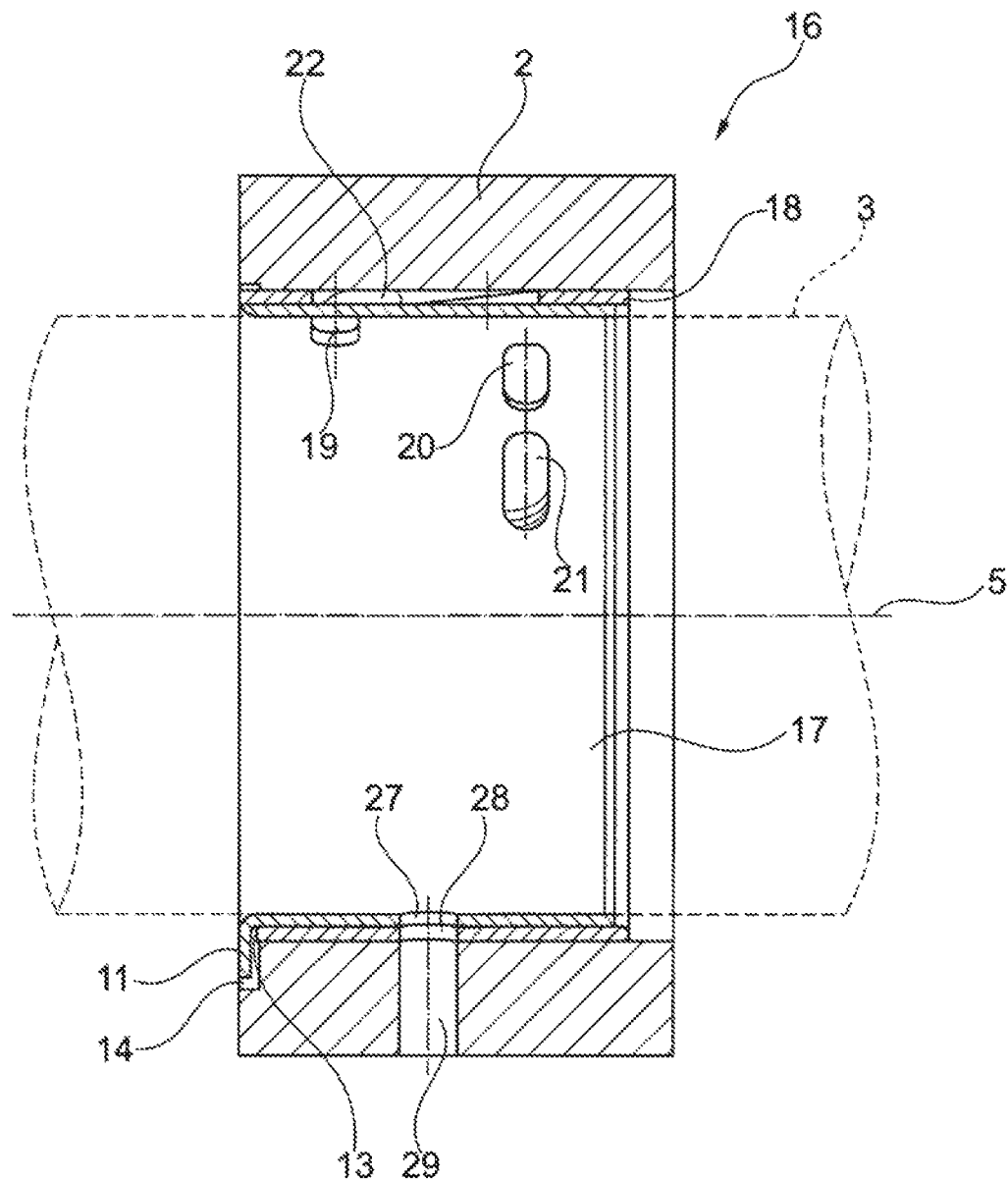
FIG. 3 is a cross-sectional view of a device, in accordance with an embodiment of the present invention.
Figure 4:
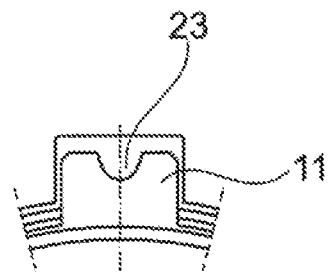
FIG. 4 is a perspective view of a safety device, in accordance with an embodiment of the present invention.

At the outset, it should be appreciated that like drawing numbers on different drawing views identify identical, or functionally similar, structural elements of the invention.

While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices and materials are now described.

FIG. 1 is a front cross-sectional view of a device, device 1, for transferring fluids between first element 2 and second element 3 arranged concentrically within each other, in accordance with an embodiment of the present invention.

FIG. 2 is a cross-sectional view along the Line II-II in FIG. 1, which corresponds to a longitudinal section along symmetry axis 5 of device 1. First element 2 is a housing section and second element 3 is gearbox shaft 12. Gearbox shaft 12 has invisible channels for fluid that converge in through-holes 7, 8 and 9 of sleeve-shaped first component 4. Through-holes 7, 8 and 9 are built into the hollow-cylindrical first component 4 and can alternatively also be differently formed openings with larger or smaller dimensions. Located between first component 4 and first element 2, hollow-cylindrical component 10 is arranged concentric with first component 4. In this exemplary embodiment, first component 4 is made of steel. In this exemplary embodiment, hollow-cylindrical second component 10 and first element 2 is made of an aluminum alloy. Accordingly, the material of second component 10 and first element 2 has a higher coefficient of thermal expansion than the material of first component 4. Safety element 11 protrudes out of first component 4, which engages radially with a positive fit into recess 14 of element 2 through recess 13 on edge 15 of second component 10.

FIG. 3 is cross-sectional view of a device, in accordance with an embodiment of the present invention. FIG. 3 shows device 16 for transferring fluids between element 11 and element 2, which are arranged concentrically to each other in a longitudinal section along symmetry axis 5. Only element 2 is shown in FIG. 3, which is formed as a housing section. Second element 3 is formed as a shaft and is only indicated by dotted lines. Device 16 is formed out of hollow-cylindrical first component 17 and hollow-cylindrical second component 18. In this exemplary embodiment, component 17 and component 18 are steel sleeves drawn from sheet metal and which sit firmly in one another. In this exemplary embodiment, first element 2 is made of a material, for example a light metal, which has a coefficient of thermal expansion greater than that of the steel out of which the sleeves have been drawn. First component 17 shows through-holes 19, 20 and 21, which correspond with longitudinal and transverse channels in the shaft if device 16 is assembled in a gearbox (not depicted in FIG. 3). Second component 18 shows slotted-hole 22 or a different recess that converges in through-hole 19. Slotted-hole 22 is restricted radially inwards from a section of first component 17, peripherally directed to the edge of long-hole 22 and radially outwards by a section of first component 17. This way, there is a channel for fluids formed between component 17 and the housing section. Furthermore, first component 17 is provided with through-hole 27 that is peripherally shifted to transverse hole 29. Through-hole 27 and transverse hole 29 are connected to each other through canal 28 that is built into component 18.

Based on the model of the device depicted in FIGS. 1 and 2, safety element 11, which is cut out from the sheet metal of first component 17 and radially bent outwards, protrudes from first component 17 and engages radially in a fully positive fit through recess 14 of first element 2, and through recess 13 on edge 15 of second component 18.

Figure 5:
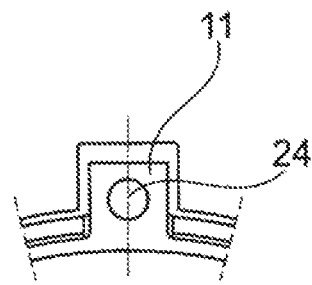
FIG. 5 is a perspective view of a safety device, in accordance with an embodiment of the present invention.
Figure 6:
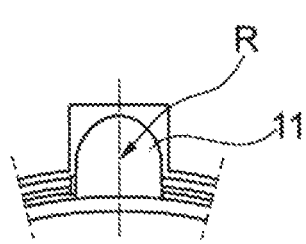
FIG. 6 is a perspective view of a safety device, in accordance with an embodiment of the present invention.
Figure 7:
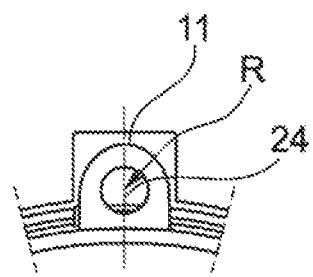
FIG. 7 is a perspective view of a safety device, in accordance with an embodiment of the present invention.
Figure 8:
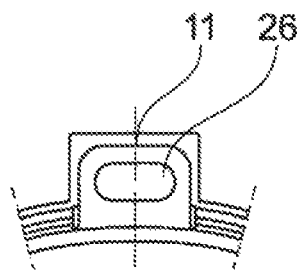
FIG. 8 is a perspective view of a safety device, in accordance with an embodiment of the present invention.
Figure 9:
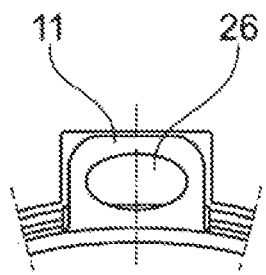
FIG. 9 is a perspective view of a safety device, in accordance with an embodiment of the present invention.

Safety element 11 is a flap-shaped or tab-like element that can have design feature alternatives described in the FIGS. 4, 5, 6, 7, 8 and 9 with detail Z of FIG. 1. According to that, safety element 11 can be a flap provided with indentation 23 at the end in accordance with the depiction according to FIG. 4. Safety element 11 depicted in FIG. 5 is a flap with through-hole 24. Safety element 11 according to the depiction in FIG. 6 is rounded off at the end with radius R. The depiction in FIG. 7 shows safety element 11 formed as a flap with through-hole 24, the end of which is rounded off with radius R. FIG. 8 shows safety element 11 having slotted-hole 26, and FIG. 9 shows safety element 11 having slotted-hole 26, wherein slotted-hole 26 is oval.

LIST OF REFERENCE NUMERALS

1 Device
2 First element
3 Second element
4 First component
5 Symmetry axis
6 Not used
7 Through-hole
8 Through-hole
9 Through-hole
10 Second component
11 Safety element
12 Gear shaft
13 Recess
14 Recess
15 Edge
16 Device
17 First component
18 Second component
19 Through-hole
20 Through-hole
21 Through-hole
22 Slotted hole
23 Depression
24 Through-hole
25 Not used
26 Slotted hole
27 Through-hole
28 Through-hole
29 Transverse hole
R Radius

What is claimed is:

1. A device for transferring fluids between two elements arranged concentrically within one another, comprising:
 a sleeve-shaped hollow-cylindrical first component arranged between a first element and a second element, wherein said first component comprises at least one through-hole for the fluid, wherein the first component is made of steel and sits in the first element, wherein the first component is prevented from turning around a symmetry axis of the first component by at least one safety element engaging form-fittingly in the first element, and wherein the first element is at least partially made of a material that has a greater coefficient of thermal expansion than the steel material, such that between the first component and the first element a second hollow-cylindrical component is arranged concentric to the first component and that the second component is secured from turning around the symmetry axis by the at least one safety element on the first element and the first component.

2. The device as recited in claim 1, wherein the at least one safety element radially engages a wall section of the second component.

3. The device as recited in claim 2, wherein the at least one safety element engages a recess from a wall on an axial edge of the second component.

4. The device as recited in claim 1, wherein the at least one safety element is at least one flap protruding radially out of the material of the first component.

5. The device as recited in claim 1, wherein the second component is made of a material that has a coefficient of thermal expansion greater than the material steel.

* * * * *